March 17, 1970  E. D. LONG  3,500,802
CONTROL CIRCUIT FOR PRECISION FUEL METERING SYSTEMS
Filed March 21, 1968  2 Sheets-Sheet 1

INVENTOR
EMILE DAVID LONG

BY Brady, O'Boyle & Gates

ATTORNEYS

INVENTOR
EMILE DAVID LONG

United States Patent Office 3,500,802
Patented Mar. 17, 1970

3,500,802
CONTROL CIRCUIT FOR PRECISION FUEL METERING SYSTEMS
Emile David Long, Elmira, N.Y., assignor, by mesne assignments, to Gillett Tool Co., Inc., Buffalo, N.Y.
Filed Mar. 21, 1968, Ser. No. 715,101
Int. Cl. F02m 69/00
U.S. Cl. 123—32
13 Claims

ABSTRACT OF THE DISCLOSURE

A circuit for generating a voltage which varies as a function of engine speed to additionally control the pulse width of an electrical energizing pulse applied to a plurality of fuel transducers which deliver a predetermined fuel charge to the respective cylinders of an internal combustion engine wherein the amount of the fuel charge being delivered is dependent upon the width of the energizing pulse.

CROSS-REFERENCE TO RELATED APPLICATIONS

This invention is related to copending U.S. patent application Ser. No. 715,056, entitled "Actuator Circuit for Electronic Precision Fuel Metering Systems," filed on Mar. 21, 1968 in behalf of E. David Long and Keith C. Richardson, and is also related but is not limited in use to copending U.S. streamlined continuation patent application Ser. No. 809,450, entitled "Electronic Modulator Circuit for Precision Fuel Metering Systems," originally filed on July 14, 1967, in behalf of E. David Long. Both applications are assigned to the assignee of the present invention.

BACKGROUND OF THE INVENTION

This invention pertains to a precision fuel metering system wherein a plurality of fuel metering transducers are employed for delivering measured amounts of fuel to cylinders of an internal combustion engine, once per engine cycle, in response to an energizing pulse generated by an analog computer referred to hereinafter as an electronic modulator. The electronic modulator receives input data corresponding to various engine operational and environmental parameters, such as engine manifold air temperature and vacuum, engine water temperature, engine speed, throttle position, and barometric pressure. The amount of fuel fed to each cylinder is dependent upon the length oft ime each of the fuel metering transducers is held in its open position in response to the energizing pulse of variable pulse width generated by the electronic modulator.

Enhancement of the operation of precision fuel metering systems of the type described can be achieved by adding an additional control to the system in response to still another engine parameter. This parameter is engine speed. The broad concept of fuel metering as a function of engine speed is not new, but is well known to those skilled in the art. For example, U.S. Patent 3,240,191, isused to K. B. Wallace on Mar. 15, 1966, and U.S. Patent 3,338,221, issued to H. Scholl on Aug. 29, 1967, illustrates two such systems. The Wallace patent illustrates two voltages being used for controlling the time interval that the fuel injectors are energized, one being the computer output and the other being a voltage which varies as a function of engine speed. These voltages, however, are applied to opposite terminals, respectively, of a time constant circuit in a monostable multivibrator. The Scholl patent, on the other hand, describes a circuit configuration coupled to a monostable multivibrator the output of which causes an increase in the pulse width of the energizing pulse for a decrease in the voltage across capacitor means coupled to the output.

In the subject invention where it is desirable to provide control of the pulse width of the energizing pulse as a function of engine speed in a system which utilizes a nonregenerative modulator circuit similar to the embodiment shown and described in the aforementioned copending application entitled "Electronic Modulator Circuit for Precision Fuel Metering Systems" and an electronic actuator circuit for said non-regenerative modulator which is shown and described in the copending application entitled "Actuator Circuit for Electronic Precision Fuel Metering Systems," Ser. No. 715,056. The known prior art apparatus is, however, inherently incapable of adequately providing the desired results.

SUMMARY OF THE INVENTION

The present invention pertains to circuit means responsive to a constant pulse width output signal of an electronic actuator circuit in response to a portion of the ignition pulse coupled from a selected sparkplug lead for generating a second control voltage which varies as a function of engine speed and comprises an R–C integrator circuit including capacitor means coupled through a steering diode to the output of the actuator circuit. The capacitor accumulates a charge which is a function of the frequency of the constant pulse width actuator pulse. This capacitor acts as an intergrator and provides a DC voltage thereacross which is coupled back to a nonregenerative electronic modulator and, more particularly, to one side of a charging capacitor included therein which is common to the application of a first control voltage which is indicative of, for example, engine induction manifold pressure. The actuator pulse is a rectangular waveform of constant pulse width and amplitude, the frequency of which is once per engine cycle. The waveform therefore has a variable frequency which is directly related to the running speed of the engine. The DC voltage across the integrator capacitor then increases and decreases as the engine, respectively, speeds up and slows down.

DESCRIPTION OF THE PREFERRED EMBODIMENT

Figure 1:
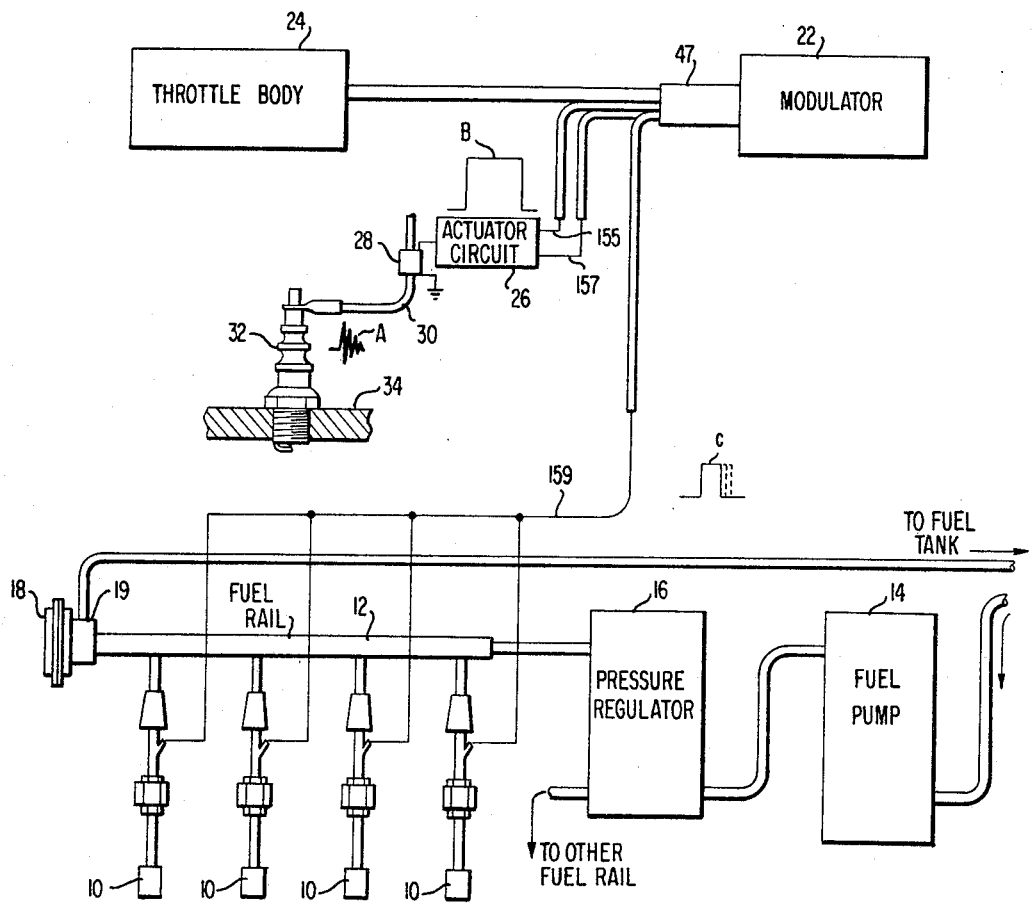
FIGURE 1 is a block diagram illustrative of a precision fuel metering system utilizing the subject invention.
Figure 3:
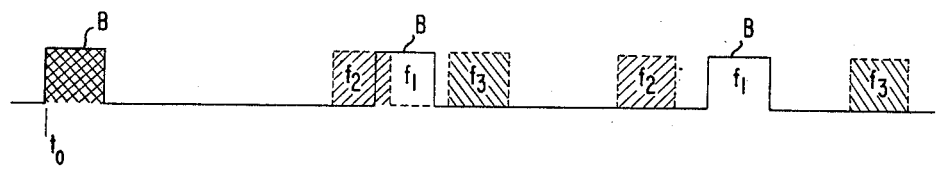
FIGURE 3 is another diagram illustrative of waveforms of the actuator circuit output showing the frequency variation thereof.

Referring now to FIGURE 1, there is disclosed a block diagram of a precision fuel metering system incorporating the subject invention. The precision fuel metering system comprises a plurality of fuel metering transducers 10 coupled to a fuel rail 12 which is fed at one end from a fuel tank, not shown, via a fuel pump 14 and a pressure regulator 16. A wave inventer assembly 18 which has for its purpose the elimination of standing waves in the fuel rail 12 is connected to the opposite end thereof and includes an exit port 19 which is connected to a return line 20. The wave inverter 18 assembly is described in detail in copending U.S. continuation-in-part patent application entitled "Fluid Compression and Expansion Wave Converter for Precision Fuel Metering Systems," filed on June 20, 1969 in the name of E. David Long and assigned to the assignee of the present invention. The precision fuel metering system is also described in greater detail in U.S. Patent No. 3,412,718, entitled "Precision Fuel Metering System," filed on June 13, 1967, and issuing on Nov. 26, 1968 to E. David Long and also assigned to the assignee of the present invention.

The fuel metering transducers 10 are adapted, for purposes of illustration, to be simultaneously energized once per engine cycle for a predetermined time interval to deliver a predetermined fuel charge to each cylinder, not shown, of the engine in accordance with an energizing pulse having a variable pulse width, waveform C, and generated by the modulator circuit 22 in accordance with engine parameters some of which are sensed by devices, not shown, located in the throttle body 24. An electronic actuator circuit 26 samples a portion of the high voltage ignition pulse A by means of electrical energy sampling means 28 and generates a constant pulse width actuator pulse B for reliably actuating the modulator circuit 22 once per engine cycle. The sampling means 28 encircles a portion of the sparkplug lead 30 connected to the sparkplug 32 mounted in the engine block 34.

The present invention contemplates generating another control voltage in response to the actuator output, waveform B, which is a rectangular pulse of substantially constant amplitude and pulse width but having a frequency which varies according to the speed of the engine for additionally controlling the pulse width of the energizing waveform C for the fuel transducers 10.

Figure 2:
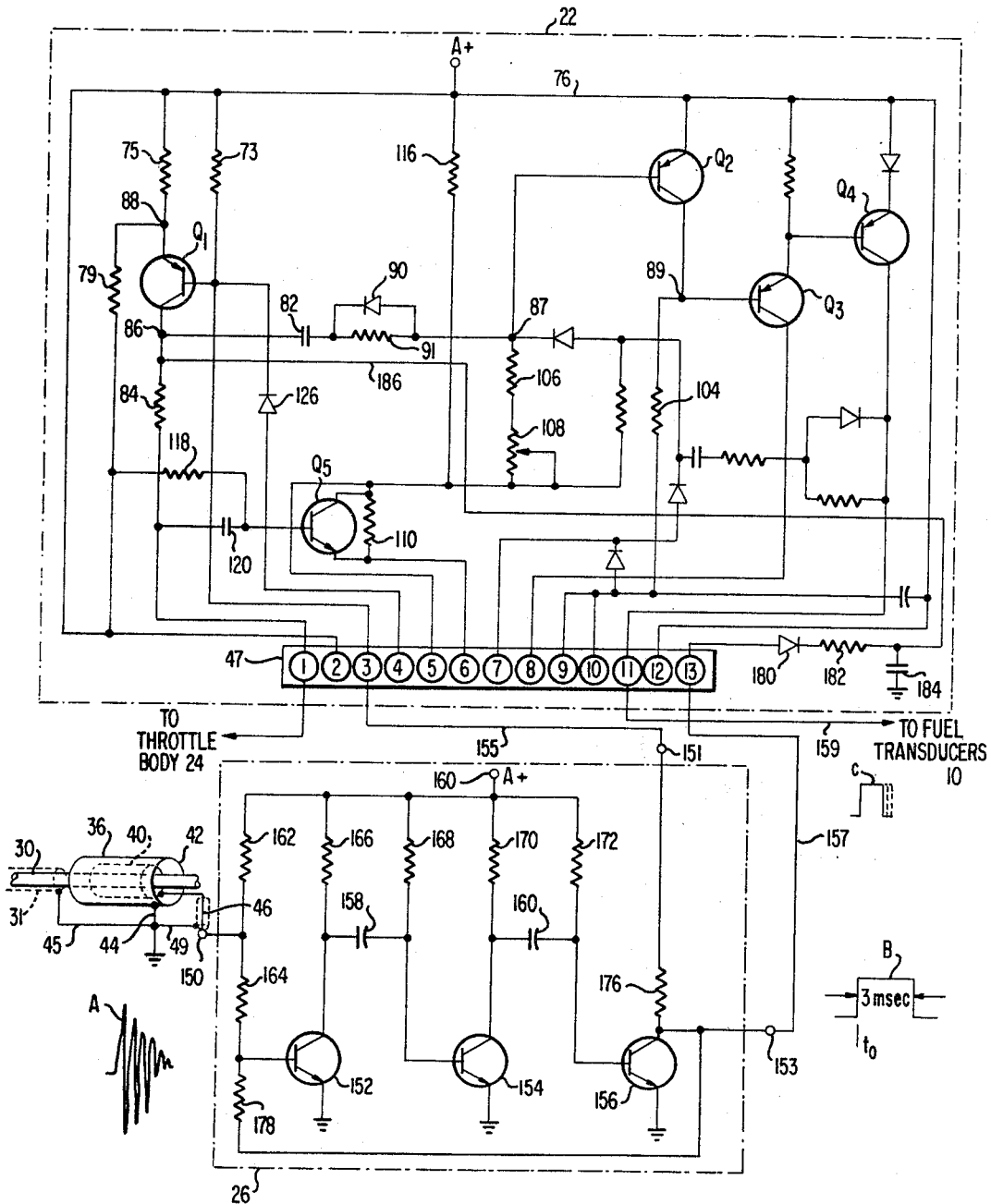
FIGURE 2 is an electrical schematic diagram of a preferred embodiment of the subject invention.

Proceeding now to FIGURE 2, the schematic diagram includes a non-regenerative modulator circuit 22 shown coupled to an actuator circuit 26. The actuator circuit 26 is coupled to an energy sampling device 36 comprised of an inner and outer concentric metallic sleeve 40 and 42, respectively, encircling a portion of a sparkplug lead 30 which is partially shielded by shield means 31. The inner sleeve 40 is coupled by means of a shielded conductor 46 to input terminal 150 of the actuator circuit 26. The sparkplug lead shield 31, the outer sleeve 42 and the shield for the lead 46 are returned to ground by means of circuit leads 45, 44 and 49, respectively. A portion of the high voltage ignition pulse appearing on the sparkplug lead 30 as illustrated by waveform A is applied to the input terminal 150.

The actuator circuit 26 is comprised essentially of three N-P-N transistors 152, 154 and 156, which are coupled together by means of capacitors 158 and 160, respectively, and is described in greater detail in the aforementioned copending application entitled "Actuator Circuit for Electronic Precision Fuel Metering Systems." The input circuit, which is comprised of resistor 162, 164, resistor 166, transistor 152 and capacitor 158, is operated in a manner so that sufficient energy is stored in capacitor 158 to effectively stretch the ignition pulse A to a required width to charge capacitor 160 through the action of transistor 154 and resistor 170.

In more detail, the input pulse from the inner sleeve 40 comprises a bipolar energy waveform A which diminishes in amplitude very rapidly. Transistors 152, 154 and 156 are biased normally "on" into the saturated region of their respective current voltage characteristics so that they conduct heavily and provide a virtually short-circuit or closed switch condition between the collector and emitter electrodes. This being the case, capacitors 158 and 160 both have their terminals substantially at ground and therefore are completely discharged. Upon the occurrence of the high voltage ignition pulse, the positive swing of waveform A will not affect transistor 152 inasmuch as it is already in its conductive state; however, the negative swing will turn transistor 152 "off." Capacitor 158 begins to charge toward the supply potential A+ through the resistor 166 and the conducting transistor 154. When the ignition pulse applied to terminal 150 falls to a value wherein transistor 152 is again returned to its conductive state, capacitor 158 has stored sufficient energy to turn "off" transistor 154. The time that transistor 154 is in the "off" state is determined by the discharge path of capacitor 158 through the "on" transistor 152 and resistor 168. When the voltage across capacitor 158 discharges to the point where it can no longer maintain transistor 154 in the non-conductive state, the transistor 154 then conducts heavily by virtue of the bias current provided through resistor 168. Meanwhile the capacitor 160 has charged toward the supply potential A+ through resistor 170 and the conducting transistor 156. At the time transistor 154 again becomes conductive, the energy stored in capacitor 160 will turn transistor 156 "off" for a time interval determined by the discharge path of the conducting transistor 154 and resistor 172. By selectively choosing the time constant of the charge and discharge circuits for capacitors 158 and 160, transistor 156 is turned "off" and held off for a period of aproximately three milliseconds giving rise to a positive going rectangular output signal waveform B at the collector of transistor 156. This waveform appears at output terminals 151 and 153. Waveform B comprises the actuator waveform for the non-regenerative modulator 22 and is coupled thereto from terminal 151 to pin 13 of the connector 47. The present invention contemplates coupling the constant pulse width waveform B appearing at terminal 153 to pin 13 of connector 47 where it is coupled through a steering diode 180 to an R-C integrator circuit comprising resistor 182 and capacitor 184. One side of the resistor is coupled to the cathode electrode of the steering diode 180 which is poled so as to conduct when the positive going rectangular waveform B appears at pin 13 of connector 47. One side of capacitor 84 is returned to ground while the opposite side is connected to the other side of resistor 182. The common connection between resistor 182 and capacitor 184 is coupled to junction 86 by means of the circuit lead 186.

The capacitor 184 operates to integrate the signal appearing at the actuator output terminal 153. Since waveform B varies in frequency as a function of engine speed, the capacitor 84 integrates this waveform and a DC voltage appears thereacross which is also a function of the engine speed. Accordingly, by means of the circuit lead 186 being coupled to junction 86, a control voltage is applied to the modulator circuit 22 which varies in amplitude as a function of engine speed. It has been found that the resistance to ground provided by the remainder of the circuitry coupled to junction 86 acts as the discharge means for the integrator capacitor 184.

The non-regenerative modulator circuit 22 is more fully described in continuation application Ser. No. 809,450, entitled "Electronic Modulator Circuit for Precision Fuel Metering Systems." It is basically comprised of transistors $Q_1$ and $Q_2$ coupled together by means of capacitor 82. In the present embodiment, however, both transistors $Q_1$ and $Q_2$ are normally conductive in a saturated state whereas in the former case transistor $Q_1$ is normally non-conductive. When transistor $Q_1$ becomes non-conductive, capacitor 82 charges to a voltage which is the difference between the positive A+ supply voltage appearing on the supply bus 76 and the voltage appearing at junction 86. Pin 1 of connector 47 is coupled to junction 86 by means of resistor 84. Pin 1 is also coupled to the wiper arm of a potentiometer, not shown, which is responsive to vacuum pressure present in the throat of the throttle body 24 shown in FIGURE 1. In the present invention, two control voltages are applied to junction 86. One is a voltage indicative of the vacuum pressure and other parameters while the other is a voltage varying as a function of engine speed. The other side of capacitor 82 is connected to junction 87 through the parallel combination of resistor 91 and diode 90. Junction 87 is at a value substantially that of the A+ supply potential due to the fact that the transistor $Q_2$ base-emitter junction is in a forward conducting mode, as is diode 90. Both act substantially as closed switches. Resistor 91 and diode 90 provide added noise immunity and stability by virtue of the switching action of diode 90 which provides a low impedance path for normal charge of capacitor 82 and a high impedance path for undesired signals.

For proper operation of the modulator circuit 22 in the present invention, the voltage appearing at junction 86 must be allowed to become equal to the combined voltages of that appearing at pin 1 of connector 47 and the voltage appearing across capacitor 184. After reaching this potential, junction 86 must be returned to substantially the emitter potential of $Q_1$. The actuator circuit 26 couples an actuator signal of sufficient pulse width (3 msec.) to the base of transistor $Q_1$ by the connection of terminal 151 to pin 3 of connector 47 to perform this necessary control function in conjunction with transistor $Q_1$. As noted above, in the subject invention, transistor $Q_1$ of the modulator circuit 22 is normally in a saturated state by virtue of the base current supplied through resistor 176 and transistor 156 in the actuator circuit 46. Upon the occurrence of the actuator pulse B, transistor 156 is turned off thereby acting as an open switch. This turns transistor $Q_1$ off by virtue of the reverse biasing action of resistors 79, 75 and 73 in the base-emitter junction circuit.

During the time that $Q_1$ is turned off, for example 3 milliseconds as shown in waveform B, the capacitor 82 will charge to a voltage substantially equal to the combined voltages of that appearing at pin 1 of connector 47 and the voltage appearing across capacitor 184. At the end of the actuator pulse B transistor $Q_1$ turns on and acts as a closed switch connecting junction 86 to the potential existing at the junction 88 of resistors 75 and 79. Depending the voltage appearing at junction 86 during the actuation pulse interval, the resulting voltage immediately appears at junction 87 due to the fact that the charge on capacitor 82 cannot change instantaneously. Moreover, the value of this voltage is the difference between the positive supply potential A+ and the voltage appearing at junction 86. This change of potential at junction 86 is in a positive direction. This turns transistor $Q_2$ off whereupon capacitor 82 begins to discharge through the discharge path comprising resistor 91, diode 90, resistor 75, the conductive transistor $Q_1$, the fixed resistor 106, rheostat 108 and any voltage sources or other elements which may be coupled thereto through pins 5 of connector 47. Transistor $Q_5$ is normally conductive to provide a virtual short-circuit across resistor 110 and accordingly does not appear in the discharge path. However, when acceleration is desired, transistor $Q_5$ is rendered non-conductive to add the additional resistance provided by resistor 110, thus increasing the discharge time constant of capacitor 82.

When transistor $Q_1$ is rendered conductive and capacitor 82 begins to discharge, it will discharge until the potential at junction 87 reaches substantially a voltage equal to A+ at which time transistor $Q_2$ will be rendered conductive once again. The voltage at the conductor of transistor $Q_2$ and consequently junction 89 is a rectangular wave which is variable in pulse width depending upon the voltage appearing at junction 86 at the time transistor $Q_1$ is turned on and the value of the discharge time constant of capacitor 82.

Transistors $Q_3$ and $Q_4$ provide an emitter follower and an amplification stage, respectively, which are coupled to the fuel metering transducers shown in FIGURE 1 through pin 11 of connector 47.

What has been shown and described therefore is means for generating an energizing pulse for fuel transducers in a fuel metering system which varies as a function of engine speed. Moreover, this energizing pulse which varies as a function of engine speed is produced partly by means of an integrator circuit coupled between an electronic actuator circuit energized by the ignition pulse of the engine and a non-regenerative modulator circuit.

Although the present invention has been described with a certain degree of particularity, it should be understood that the present disclosure has been made by way of example only and that changes in the detail of the circuitry in the combination or arrangement of elements may be resorted to without departing from the scope and spirit of the present invention.

What is claimed is:

1. An electronic system for operating a precision fuel metering system in response to engine speed as well as power demand from the engine comprising in combination:

(a) an electrical energy sampling means located adjacent a spark plug lead for sampling a portion of the high voltage ignition pulse appearing thereon;

(b) an electronic pulse actuator circuit coupled to said energy sampling means, being responsive to the sampled portion of the ignition pulse to produce a substantially constant pulse width signal once per engine cycle;

(c) a non-regenerative modulator circuit generating a variable pulse width energizing pulse for operating one or more electrical fuel metering transducers, and including, a source of electrical supply voltage;

switch means coupled to said source of supply voltage and said actuator circuit being responsive to said substantially constant pulse width signal to be rendered electrically conductive and non-conductive for a predetermined time during each engine cycle;

a first transistor having a base, an emitter, and a collector, coupled to said source of supply voltage including variable resistance means coupled to said base for biasing said transistor in a normally conductive state of operation;

a voltage divider network coupled to said source of supply voltage including a potentiometer responsive to changes in power demand from the engine and having a wiper contact whose position and voltage appearing thereat is variable in accordance with said changes in power demand;

an integrator circuit coupled to said actuator circuit being responsive to said substantially constant pulse width signal and providing a voltage thereat which is variable in accordance with engine speed;

single circuit means, including at least one capacitor coupled between said switch means and said first transistor, whereby the operation of said first transistor is responsive to the operation of said switch means but the operation of said switch means is unresponsive to the operation of said first transistor, said at least one capacitor having one side thereof commonly coupled to said switch means, said wiper contact arm of said potentiometer, and said integrator circuit forming a first junction thereat and having the other side thereof coupled to the base of said first transistor and said variable resistance means forming a second junction, said at least one capacitor being operable to be charged through said first transistor when said switch means is non-conductive to a voltage which is substantially equal to the magnitude of said supply voltage less the magnitude of the voltage at said wiper contact arm and integrator circuit but when said switch means is rendered electrically conductive said supply voltage is additionally applied to said one side of said capacitor and said first transistor is driven non-conductive thereby due to the fact that the charge on said capacitor cannot change instantaneously and said capacitor then discharges at a predetermined rate as a function of the value of said capacitor and said variable resistance means through said switch means and said variable resistance means until the voltage at said base is at a level sufficient to cause said transistor to again become conductive; and (d) output circuit means coupled to said first transistor for coupling a signal to said fuel metering transducer means produced in accordance with the operation of said first transistor as a result of the voltage to which said capacitor charges and discharges.

2. The invention as defined by claim 1 wherein said integrator circuit comprises an R-C integrator circuit.

3. The invention as defined by claim 2 and additionally including diode means coupled between said actuator circuit and said R-C integrator circuit, being selectively poled to conduct upon the occurrence of said actuator signal.

4. The invention as defined by claim 3 wherein said diode means comprises a semiconductor diode.

5. The invention as defined by claim 3 wherein said diode includes an anode and a cathode electrode and wherein said R-C integrator circuit comprises a capacitor and a resistor, circuit means coupling said cathode electrode to one side of said resistor, circuit means coupling said anode electrode to said actuator circuit, circuit means coupling one side of the capacitor of said R-C integrator circuit to ground, and circuit means commonly coupling the opposite side of said capacitor and resistor to said one side of said capacitor in said modulator circuit.

6. The invention as defined by claim 1 wherein said switch means comprises:
a second transistor in a normally conductive state of operation having a base, an emitter, and a collector, and
additionally including circuit means coupling said substantially constant pulse width signal of said actuator circuit to said base for rendering said second transistor non-conductive.

7. The invention as defined by claim 6 and wherein said single circuit means additionally includes:
a parallel combination of a diode and a resistor coupled in series to said at least one capacitor.

8. The invention as defined by claim 6 and including means coupling said emitter to said source of supply voltage and said collector to said first junction.

9. The invention as defined by claim 1 wherein said electronic pulse actuator circuit (b) comprises:
a second transistor normally biased in a conductive state of operation;
means coupling said second tranistor to said electrical energy sampling means, said second transistor being operative to become non-conductive in response to said sampled portion of said ignition pulse;
a second capacitor coupled to said first transistor being adapted to change its electrical charge state in accordance with the non-conductive state of said second transistor;
a third transistor normally biased in a conductive state of operation coupled to said second capacitor to become non-conductive for a predetermined time period after the occurrence of said sampled portion of said ignition pulse;
a third capacitor coupled to said third transistor being adapted to change its electrical charge state in accordance with the non-conductive state of said third transistor;
a fourth transistor normally biased in a conductive state of operation coupled to said third capacitor, being responsive to said change in electrical charge state of said third capacitor to become-non-conductive for a predetermined time interval, said second, third and fourth transistors becoming non-conductive sequentially once per engine cycle and thereby generating said substantially constant pulse width signal; and
circuit means coupling said fourth transistor to said switch means.

10. An electronic system for operating one or more fuel transducers in a metering system in response to engine speed as well as power demand from the engine comprising in combination:
(a) an electrical energy sampling means comprising a capacitive pickup element including an inner and outer electrically conductive sleeve concentrically disposed around a portion of a spark plug lead for sampling a portion of the high voltage ignition pulse appearing thereon;
circuit means connecting said outer sleeve to a point of reference potential;
(b) an electronic pulse generating circuit coupled to said inner sleeve, being responsive to the sampled portion of said ignition pulse to produce a substantially constant pulse width actuation signal, said electronic pulse generating circuit including:
a first transistor normally biased in a conductive state of operation, means coupling said first transistor to said inner sleeve, said first transistor being operative to become non-conductive in response to said sampled portion of said ignition pulse,
first capacitor means coupled to said first transistor being adapted to change its electrical charge state in accordance with the non-conductive state of said first transistor,
a second transistor normally biased in a conductive state of operation coupled to said first capacitor means, being responsive to said change of electrical charge of said first capacitor to become non-conductive for a predetermined time period after the occurrence of said sampled portion of said ignition pulse,
second capacitor means coupled to said second transistor being adapted to change its electrical charge state in accordance with the non-conductive state of said second transistor, and
a third transistor normally biased in a conductive state coupled to said second capacitor, being responsive to said change in electrical charge state of said second capacitor to become non-conductive for a predetermined interval, said first, second and third transistors becoming non-conductive sequentially once per engine cycle and thereby generating said substantially constant pulse width signal;
(c) an electronic modulator circuit coupled to said third transistor and being triggered by said substantially constant pulse width signal to produce a variable pulse width energizing pulse coupled to said one or more fuel transducers for operating said transducers to deliver measured amounts of fuel to the engine;
(d) a resistor and a capacitor commonly coupled together at one end thereof, circuit means coupling the other end of said resistor to said third transistor and the other end of said capacitor to a point of reference potential forming an R-C integrator circuit thereby and developing a voltage across said capacitor which varies as a function of engine speed, and circuit means coupling said one end of said R-C integrator circuit to said modulator circuit to control the pulse width of said variable pulse width energizing pulse.

11. The invention as defined by claim 10 and additionally including:
(e) first electrical shielding means covering a predetermined portion of said spark plug lead;
(f) and a shielded circuit conductor including second electrical shielding means, coupled between said inner conductive sleeve and said first transistor; and
circuit means connecting said first and second electrical shielding means to said point of reference potential.

12. A non-regenerative modulator circuit operated by means generating a control signal once per engine cycle for generating a variable pulse width energizing pulse to control the energization time of electrical fuel metering transducer means for an internal combustion engine comprising in combination:
- a source of electrical supply voltage;
- normally conductive switch means coupled to said source of supply voltage and said means generating said control signal and being responsive to said control signal to be rendered electrically non-conductive for a predetermined time during each engine cycle;
- a first transistor having a base, an emitter, and a collector, coupled to said source of supply voltage including variable resistance means coupled to said base for biasing said transistor in a normally conductive state of operation;
- a voltage divider network coupled to said source of supply voltage including a potentiometer responsie to changes in power demand from the engine and having a wiper contact whose position and voltage appearing thereat is variable in accordance with said changes in power demand;
- single circuit means, including at least one capacitor and a parallel combination of a resistor and diode series connected to said capacitor, coupled between said switch means and said first transistor whereby the operation of said first transistor is responsive to the operation of said switch means but the operation of said switch means is unresponsive to the operation of said first transistor, said at least one capacitor having one side thereof commonly coupled to said switch means and said wiper contact arm of said potentiometer forming a first junction and having the other side thereof coupled to the base of said first transistor and said variable resistance means through said parallel combination forming a second junction, said at least one capacitor being operable to be charged through said first transistor and said diode when said switch means is non-conductive to a voltage which is substantially equal to the magnitude of said supply voltage less the magnitude of the voltage at said first junction but when said switch means is rendered electrically conductive said supply voltage is additionally applied to said one side of said capacitor and said first transistor is driven non-conductive thereby due to the fact that the charge on said capacitor cannot change instantaneously and said capacitor then discharges at a predetermined rate as a function of the value of said capacitor, said variable resistance means, and said resistor until the voltage at said base is at a level sufficient to cause said first transistor to again become conductive; and
- output circuit means coupled to said first transistor for coupling a signal to said fuel metering transducer means produced in accordance with the operation of said first transistor as a result of the voltage to which said capacitor charges and discharges.

13. The invention as defined by claim 12 wherein said normally conductive switch means comprises a second transistor having a base, an emitter, and a collector and additionally including circuit means coupling said control signal to said base.

References Cited
UNITED STATES PATENTS

| | | | |
|---|---|---|---|
| 2,829,631 | 4/1958 | Wilt | 123—139 |
| 3,020,897 | 2/1962 | Sekine et al. | 123—32 |

LAURENCE M. GOODRIDGE, Primary Examiner

U.S. Cl. X.R.

123—119, 139, 140